Sept. 3, 1946.　　　　　I. WOLFF　　　　　2,407,198

DISTANCE AND DIRECTION DETERMINATION SYSTEM

Filed March 19, 1938　　　2 Sheets-Sheet 1

Inventor
Irving Wolff
By
Attorney

Sept. 3, 1946. I. WOLFF 2,407,198
DISTANCE AND DIRECTION DETERMINATION SYSTEM
Filed March 19, 1938 2 Sheets-Sheet 2
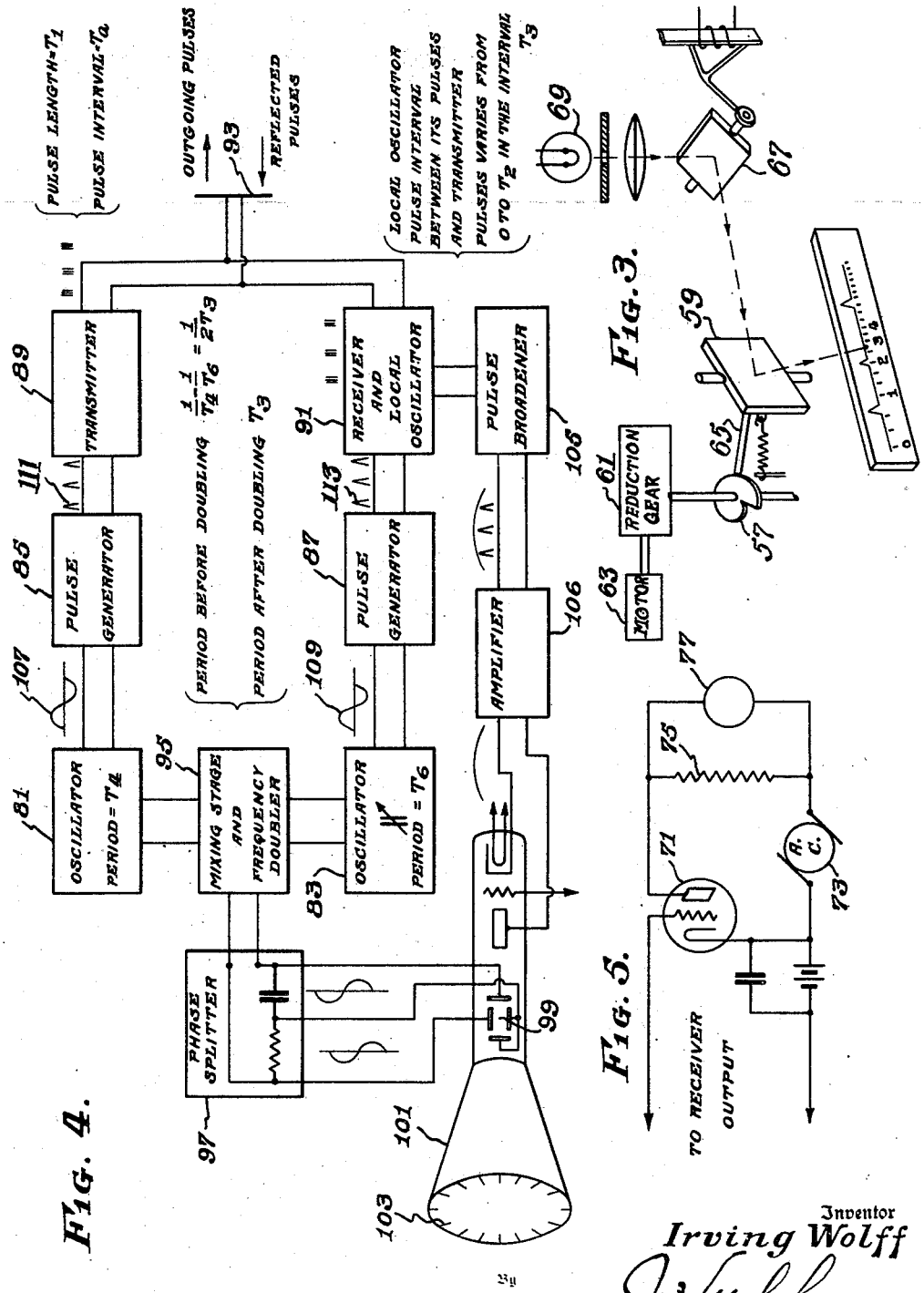
Inventor
Irving Wolff
Attorney Patented Sept. 3, 1946

2,407,198

UNITED STATES PATENT OFFICE 2,407,198

DISTANCE AND DIRECTION DETERMINATION SYSTEM

Irving Wolff, Merchantville, N. J., assignor to Radio Corporation of America, a corporation of Delaware Application March 19, 1938, Serial No. 196,863

21 Claims. (Cl. 250—1)

My invention relates to distance and direction determination, and more specifically to object detection by means of radio pulses which are transmitted toward an object and received, after reflection therefrom, after an interval, from which the distance to the object may be determined.

It has been previously proposed to measure distances or detect objects by transmitting a radio pulse and simultaneously starting a cathode ray movement, which effects a visual trace, which is marked by the return of the transmitted pulse after it is reflected from a remote object. A similar system for measuring the height of the Heaviside layer has been described in an article by Breit and Tuve in the "Physical Review," vol. 28, September 1926, pages 554 to 575. In another system, the method of transmission is similar to that above, but reception and distance measurement are accomplished by using a different principle. The receiver is of the superheterodyne type, but its local oscillator, instead of being continuously operated, is "keyed on" momentarily a determinable interval after the transmitted pulse. If the local oscillator is "keyed on" at the same instant that the reflected transmitted pulse is received, the two combine to produce an indication. The interval between the outgoing pulse and the received reflected pulse is equal to the time required for the radio pulse (traveling at 300,000,000 meters per second) to go from the transmitter to the reflecting object and back to the receiver. The last described system is disclosed in U. S. Patent 1,988,020 which issued to Frank Rieber on January 15, 1935.

The first described prior art system operates automatically and continuously indicates reflections from objects within its range. Its indications differentiate between nearby and remote reflections. With this system, it is not practical to stop the continuous operation in order that a reflecting object at a certain distance may be investigated. It is also evident that the indicating instrument must have a response time which is determined by the length of the emitted pulse. This ordinarily excludes indicators other than the cathode ray indicators, and makes amplification difficult because of the high frequencies involved.

In the second system, the operation is manual. That is, the interval between the transmitted pulse and the keying on of the local oscillator is manually adjusted. Therefore, after a reflection has been received, the operator may hold the adjustment and scan the reflecting object by directing a beam of pulse energy over the contour of the reflecting body. While the manual operation is convenient for scanning, it is inconvenient for continuous operation; e. g., manual scanning would be of slight value in an aircraft traveling at several hundred miles per hour toward an obstacle.

As one of the objects of my invention, I propose to provide means for continuously and differentially indicating objects which reflect radio waves. Another object is to provide means for transmitting a radio pulse and observing its reflection whereby the reflecting object may be scanned. An additional object is to provide means whereby a radio object detecting system may be either automatically and continuously operated to differentiate between various reflections, or manually operated to observe particular reflections. A still further object is to provide means whereby distance between a transmitter and reflecting object may be accurately, automatically and continuously measured by means of an indicator which may have a relatively slow response time, thereby permitting a wide choice of indicating instruments.

My invention will be described by referring to the accompanying drawings, in which Figure 1 is a schematic diagram representing one embodiment of a radio object detecting or distance measuring system in accordance with the invention;

Figures 2A and 2B are front and side views of an indicator used in the system of Fig. 1;

Figure 3 is a schematic illustration of another type of indicator;

Figure 4 is a schematic circuit diagram of a modified obstacle detecting system; and Figure 5 is a circuit diagram of a pulse broadener.

Referring to Fig. 1, an oscillator 1 is connected to a pulse generator 3, which is connected to a transmitter 5. The transmitter is coupled by a transmission line, or other suitable means to a directional antenna 7, which may include a reflector 9. The oscillator 1 is also connected to a phase splitting network 11 which is connected to a phase shifter 13. The phase shifter includes a rotor 15 which is driven at uniform speed by a motor 17. The output terminals of the rotor are connected through slip rings and brushes (not shown) to a second pulse generator 19. The second pulse generator 19 is connected to the local oscillator 21 of a superheterodyne receiver 23 whereby the local oscillator may be "keyed on" momentarily at different intervals. It should be understood that "keying on" the oscillator is equivalent to a fast operating sensitivity control of a receiver and therefore any fast responding sensitivity control may be used in addition or in place of "keying" the oscillator by applying the second pulses to operate such control.

The superheterodyne receiver 23 is connected to a directive receiving antenna, which may be the transmitting antenna 7, or a separate antenna 25 and reflector 27. If a pair of antennas and reflectors are used, their movements should be synchronized during scanning so that the beam from both transmitting and receiving antennas will be focused on the obstacles whose presence is to be detected. A single antenna system, of the type disclosed in the copending application Serial No. 184,354, filed by Wolff and Hershberger on January 11, 1938, is preferable, as such system avoids synchronizing the focusing and reduces the number of required elements.

The output from the receiver 23 may be applied through a pulse broadener 29, to an indicator 31, which may be a light valve, gas tube, or the like. The indicator 31 is arranged adjacent a quartz tube 33 (see Figs. 2A and 2B) which may be rotated on a disc 35. The disc is rotated, past scale markings 37, by the motor 17 which is coupled through a 1:2 reduction gear 39. The reduction gear is not essential and its use depends upon whether the keying pulses occur once or twice per cycle and whether or not a 180° or 360° scale is desired. A keying pulse generator, having two pulses per cycle, is disclosed in the copending application, Serial No. 196,125, filed March 16, 1938, by C. W. Hansell and O. E. Dow, entitled "Pulse generator."

Inasmuch as the intervals or times at which the several steps of my method of object detection or distance determination occur are of importance, and because definitions of these intervals will aid in understanding the invention, these intervals will be defined or described.

1st. The pulse length $T_1$ is the time from the start to the completion of any outgoing pulse. It is determined by the equation $T_1 c = 2d$, where $d=$shortest distance to be resolved, $c=$velocity of radio waves.

2nd. The pulse interval $T_2$ is the time between successive outgoing pulses. $T_2$ is determined by the maximum distance from which reflected pulses are to be received. $T_2 c = 2D$, where $D=$ maximum distance.

3rd. The time required to shift the local oscillator pulse from the beginning of an outgoing pulse to the beginning of the next succeeding outgoing pulse is called $T_3$.

4th. The time between the beginning of an outgoing pulse and the beginning of a local oscillator pulse is called $t$, and is made continuously variable.

5th. The period of the sine wave used to generate the pulses is called $T_4$ and is equal to $2T_2$, using the system of the Hansell and Dow pulse generator, but using some other system could equal $T_2$ or some other multiple of it.

6th. The maximum allowable time $T_5$ of the indicating device is equal to $$\frac{T_3 d}{D}$$

7th. The period of rotation of the rotor 15 is equal to $T_3$. This time is preferably determined so that its rate will be above the persistence of vision.

Referring to Fig. 1, the oscillator 1 generates alternating currents 41 of a period $T_4$ and preferably of sine wave form. These currents are applied to the pulse generator in which sharply defined pulses of current 43 are generated for each instant of substantially zero potential of the sine wave 41. These pulses are of very brief duration $T_1$ compared to the intervals $T_2$ between pulses. The pulses 43, which may be amplified and/or shortened if necessary (as disclosed in the copending application Serial No. 182,418, filed December 30, 1937, by Irving Wolff) key the transmitter which applies radio frequency currents 45 to the antenna from which waves or pulses of radio frequency energy are radiated. The radiated waves, after reflection from an object 47, are received by the superheterodyne receiver, which can not respond unless the local oscillator is, at that instant of reception of the reflected pulses, generating currents of a frequency which mixes with the incoming radio frequency currents to produce intermediate frequency currents.

The operation of the local oscillator will be considered by tracing the operation of the oscillator 1 whose sine wave currents 41 are applied to a phase splitter network 11 which establishes currents of two phases 49, 51. One phase leads the other by 90°. The two phases are applied to the phase shifter 13 which generates a rotating field. Inasmuch as the rotor 15 is rotated in the rotating field, sine wave currents will be induced in the rotor. These currents 53 will be of a period which is either greater or less than $T_4$, depending upon the relative direction of rotation of the field and the rotor. Assuming that the period of the rotor currents 53 is less than $T_4$, the phase of the rotor currents will continuously advance with respect to the phase of the oscillator currents $T_4$.

Just as pulse currents 43 were generated by the pulse generator 9, so will pulse currents 55 be generated by the second pulse generator 19. While the interval $T_2$ of the former is fixed by $T_4$, the interval of the latter is fixed by the moments of substantially zero potential of the sine wave current 53. The intervals $t$ between the transmitter keying pulses 43 and the local oscillator keying pulses 55 are continuously variable because the phase of the currents 53 continuously varies with respect to the phase of the currents 41. The pulses 55 are applied to the local oscillator 21, whereby it is "keyed on" at a continuously variable time with respect to the outgoing pulses.

Since the interval $t$ is continuously variable, it will be seen that for brief instants the local oscillator currents and the reflected radio waves will be simultaneously applied to the receiver. The receiver output currents will control the illumination of the indicator 31, when the reflected waves and the local oscillator currents combine. The disc 35 rotates in synchronism with the rotor 15, because they are coupled to the same motor. Therefore, for each change of phase, or for each elementary interval $t$ the disc has a discrete position, and its position is an indication of the "delay" or interval $t$ which must be established between the outgoing pulse and the returning reflected pulse. Since the wave velocity is known, the distance the wave has travelled from the transmitted to the reflecting object and back may be determined by suitably calibrating the scale.

Since the waves will be reflected from objects at different distances, it will be desirable to differentiate between the several reflections. Such differentiation requires a rapidly responding indicator whose maximum time of response is equal to $$\frac{T_3 d}{D}$$

It should be understood that the response time may be shorter. In the cases where a rotating indicator is used, the scale will be uniform because the period of rotation of the indicator is preferably uniform. In some instances a hyperbolic scale may be desirable whereby the scale may be spread to widely space the indications from nearby obstacles and closely space indications from remote objects or vice versa.

One type of hyperbolic indicator is shown in Fig. 3. In this arrangement, a cam 57 of suitable shape is interposed between a mirror 59 and the reduction gear 61 which is driven by the motor 63. The cam 57 drives a cam follower 65 back and forth. The mirror 59 is oscillated by the cam follower, reflecting a line of light which is focused on the mirror by a galvanometer mirror 67 which reflects light from a light source 69. The galvanometer is operated by the output currents from the receiver. The axii of the mirrors are at right angles to each other, whereby one moves a light beam across the scale and the other varies the light beam in accordance with received signals.

In either type of indicator, the indication period $T_3$ is preferably above the persistence of vision; e. g., 20 times per second. Since for each $1/20$ second a number of pulses will be received, it is of advantage to integrate these pulses whereby the visual indication is lengthened to thereby increase the amount of useful illumination. This may be effected by applying the output of the receiver to a pulse broadener 29. One suitable form of pulse broadener is schematically illustrated in Fig. 5. The receiver output is connected to the input of a gaseous discharge tube 71. The output of the tube includes an alternating current source 73 of a period lower than $T_5$ and a resistor 75. The indicator 77 is connected across the resistor. When signal impulses are derived from the receiver and applied to the pulse broadener, the applied input potentials will key the gas tube on during the half cycles which apply positive potentials to the anode and therefore integrate the signal pulses. Another form of pulse broadener is a rectifier having an output circuit with a time constant of the order $T_5$.

The system described by reference to Fig. 1 employs moving parts. If a particular reflecting object is to be scanned, the automatic rotation of the phase shifter and indicator may be stopped at that point which indicates the reflecting object or obstacle. The phase shifter can then be moved slowly back and forth about the point which indicates the obstacle to thereby judge its distance. With the phase shifter and indicator fixed, the antenna can be moved back and forth through an angle in a horizontal plane. The horizontal dimension of the object will be a function of the scanning angle and the distance. In like manner, the antenna may be oscillated through an angle in a vertical plane and from the angle and distance the vertical dimensions of the obstacle may be determined.

In Fig. 4 a modified obstacle detecting system is shown. In this arrangement, a pair of oscillators 81, 83 having periods $T_4$ and $T_6$ respectively are connected to a pair of pulse generators 85, 87. The output from one pulse generator 85 is used to key the transmitter 89. The output from the other pulse generator 87 is used to key the local oscillator in the receiver 91. The transmitter and receiver may be connected to a common antenna 93 in accordance with the above mentioned Wolff and Hershberger application.

The oscillator output currents are combined in a mixing and frequency doubler stage 95. The combined currents have a period before doubling as follows:

$$\frac{1}{T_4} - \frac{1}{T_6} = \frac{1}{2T_3}$$

and after frequency doubling the mixed currents have a period of $T_3$. These currents are applied to a phase splitter 97 and the output therefrom is applied to the deflecting elements 99 of a cathode ray tube 101. The effect of the deflecting forces is to uniformly rotate the cathode ray in a circular path, which will leave a trace on the end of the tube 101, including the scale 103. The output from the receiver is applied through a pulse broadener 105 and an amplifier 106 to the cathode-anode elements of the cathode ray tube 101.

The operation of the system of Fig. 4 is not unlike that of Fig. 1. In the present system (Fig. 4) the sine wave currents 107—109 establish in the pulse generators 85—87 keying pulses 111—113 which occur at the instances when the sine waves go through zero. The keying pulses are applied to the transmitter 89 and local oscillator 91. If the period of one oscillator is $T_4$ and the other is $T_6$, the phase of one oscillator continuously shifts with respect to the other and thus the keying of the local oscillator is continuously varied with respect to the keying of the transmitter. The time required to thus vary the keying of the local oscillator throughout a complete phase shift is $T_3$, which is preferably above the persistence of vision. Since the cathode ray sweep period is also $T_3$ and since the sweep voltage is derived from the same sources as the keying voltages, the cathode ray will rotate in synchronism with the changing phase of the keying. When the received pulses are applied to deflect the cathode ray on the scale 103, its point of deflection will correspond to the relative keying phases and is a measure of the interval $t$ between the outgoing and reflected pulses. The scale 103 may be calibrated to indicate the distance from the transmitter to the reflecting obstacle, in accordance with the equation $tC=2d'$ where $2d'$=distance from transmitter to obstacle plus obstacle to receiver.

Thus I have described two object detectors which operate by transmitting pulses of radio frequency energy which are reflected from an object and received by combining with a later pulse of radio frequency current from a local oscillator. The first described system uses a mechanical phasing and indicating device. The second system does not employ mechanical moving parts. The former system is especially adapted for scanning a particular reflecting object. Such scanning may be effected by manually adjusting the relative phases of the local oscillator and transmitter, and by moving the beam of the transmitted pulses over the area of the object being detected. The systems may be used on mobile vehicles to detect remote obstacles, or may be fixed to detect moving bodies.

I claim as my invention:

1. An object detector including in combination means for radiating pulses of radio frequency energy, a superheterodyne device including a local oscillator for receiving said energy after reflection from the object to be detected, means for making the local oscillator of said receiving device oscillate at continuously varying intervals after the radiation of each of said pulses, a second means synchronously varying at said continuously varying rate, and means including said device for indicating the response to said reflected energy.

2. An object detector including in combination means for radiating pulses of radio frequency energy at discrete intervals, a superheterodyne device including a local oscillator, for receiving said energy after its reflection from an object, means for making the local oscillator of said receiving means generate pulses of radio frequency energy which beat with said received energy at intervals which vary continuously within said discrete intervals, and means for indicating the response of said superheterodyne device, said last-mentioned means varying synchronously with the variation of said local oscillator to indicate the interval between the transmission and reception of a radiated pulse.

3. An object detector including an oscillator for generating a sine wave current, means for establishing pulses corresponding to discrete positions of said sine wave, means for radiating radio frequency energy corresponding to said pulses; a superheterodyne receiver, including an oscillator normally "keyed off," for receiving said pulses after reflection from an object to be detected; means for "keying on" said oscillator, at intervals continuously varying with respect to said discrete portions of said sine wave current, so that said received pulses may be detected; an indicator synchronously varying in step with said oscillator keying intervals, and means for applying the output from said superheterodyne receiver to said indicator whereby the relative phase of said radiated pulse and said oscillator pulse may be observed.

4. In a system of the character of claim 3, means for scanning a particular reflection, including means for directing the radiated pulses horizontally and vertically over the reflecting object and means for maintaining a desired phasal relation during said scanning.

5. An object detector including a source of sine wave current of one period, a second source of sine wave current of another period, means for radiating radio freqency energy at intervals corresponding to the zero potential of one of said sine waves, a receiver responsive to the radiated energy after reflection from the object to be detected, means for operating said receiver at intervals corresponding to the zero potential of the other of said sine waves, an indicator operated by a current which bears a functional relation to the difference frequency of said sine wave currents, and means for energizing said indicator when reflected pulses of radio frequency energy are received and when said receiver operations simultaneously take effect.

6. In a device of the character of claim 5, an indicator further characterized in that its maximum response time for a single indication $$T_5 = \frac{T_3 d}{D}$$

where $T_3$ equals time required to move said indicator through a complete cycle, $d$ equals shortest distance to be resolved, and $D$ equals maximum distance to be resolved.

7. In a device of the character of claim 1, said means for indicating having a maximum response time for a single indication $$T_5 = \frac{T_3 d}{D}$$

where $T_3$ equals time required to move said indicator through a complete cycle, $d$ equals shortest distance to be resolved, and $D$ equals maximum distance to be resolved.

8. A distance-indicating device including in combination a source of alternating current, means for generating pulses as a function of said current, means controlled by said pulses for radiating radio frequency energy, means responsive at different intervals for receiving said energy after said energy is reflected from an object whose distance is to be indicated, the means controlling the time of response of said responsive means including a phase shifter energized by said alternating current and including a rotor across whose output terminals appears a second alternating current of different phase from said first-mentioned alternating current, an indicator, means for moving said indicator in synchronism with said rotor, and means for energizing said indicator when a reflected pulse is received at the moment said receiver is made responsive.

9. In a distance indicating device, the method of measuring distance which comprises radiating a pulse of radio frequency energy, receiving said pulse after reflection from an object whose distance is to be determined, generating a second pulse at continuously varying intervals with respect to said radiated pulse, receiving said second pulse, deriving signals when said received reflected pulse and said second pulse are simultaneously received, moving a light beam in synchronism with said continuously varying intervals, and varying said light beam by applying said derived signals to thereby indicate said received pulses.

10. In the method of the foregoing claim, the added step of broadening the signals applied to vary said light beam.

11. The method of determining distance between a transmitter and a distant object which comprises generating a sine wave current, establishing pulses at discrete positions of said sine wave, radiating radio frequency energy corresponding to said pulses, receiving said pulses after reflection from said object, applying a current at continuously varying times to beat with said pulses, moving a light beam in synchronism with said continuously varying times, and applying said currents derived from said beat to vary said light beam so that the said variations of said beam indicate reflections from distant objects and are proportional to said distance.

12. In the method of determining distance described by claim 11, the further step of broadening the currents derived from said beat before their application to vary said light beam.

13. The method of indicating an object which comprises generating a sine wave current of one period, generating a sine wave current of a second period, radiating pulses of radio frequency energy at intervals corresponding to discrete portions of said first sine wave, receiving said pulses after reflection from an object to be detected, establishing an operative condition of said receiver at intervals corresponding to discrete portions of said second sine wave, moving a light indicating beam in synchronism with the difference in frequency of said two sine waves, and varying said light indicating beam at intervals corresponding to the reception of said reflected pulses.

14. In the method described by claim 13, the additional step of broadening the received pulses before their application to vary said light indicating beam.

15. In a distance indicating device, the method of measuring distance which comprises radiating a pulse of radio frequency energy, receiving said pulse after reflection from an object whose distance is to be determined, applying currents of a beating frequency to said received pulse at continuously varying intervals, moving a light beam in synchronism with said continuously varying intervals, and varying said light beam by applying currents derived from said received pulses and corresponding to said beat frequency to thereby indicate said received pulses.

16. In the method described by claim 15, the added step of broadening the currents applied to vary said light beam.

17. The method of determining distance between a transmitter and a distant object which comprises generating a sine wave current, establishing pulses at discrete positions of said sine wave, radiating radio frequency energy corresponding to said pulses, receiving said pulses after reflection from said object, generating a second pulse at continuously varying intervals with respect to said radiated pulse, deriving signals when said received reflected pulse and said second pulse are simultaneously received, moving a light beam in synchronism with said continuously varying intervals, and applying said signals to vary said light beam whereby said variations of said beam indicate reflections from distant objects and are proportional to said distance.

18. In the method of determining distance described by claim 17, the further step of broadening the signals before their application to vary said light beam.

19. An object detecting system, comprising means for generating and radiating radio frequency pulses, means for receiving said pulses after reflection from an object, means to generate at continuously varying intervals pulses of a radio frequency different from the radio frequency of said received pulses to beat with said received pulses and to establish currents of intermediate frequency, and means actuated by said currents of intermediate frequency to indicate the interval between transmission of a radiated pulse and reception of the reflection thereof.

20. Apparatus as set forth in claim 19, including means for integrating said currents of intermediate frequency to lengthen said indication.

21. A method of detecting and indicating remote objects by an indicating instrumentality having elements movable in transverse planes, comprising the steps of generating and radiating pulses of radio frequency energy, receiving said pulses after reflection from the said object, generating continuously varying pulses to beat with said received pulses to establish currents of intermediate frequency, moving an indicating instrumentality in one plane in synchronism with said varying pulses, and applying potentials derived from said currents of intermediate frequency to move said instrumentality transversely to said one plane.

IRVING WOLFF.